(12) United States Patent
Clubine

(10) Patent No.: US 7,565,838 B2
(45) Date of Patent: Jul. 28, 2009

(54) PROPELLER TUNER ASSEMBLY

(75) Inventor: John Richard Clubine, Seattle, WA (US)

(73) Assignees: George W. Clubine, Seattle, WA (US); Richard T. Clubine, Spokane, WA (US)

( * ) Notice: Subject to any disclaimer, the term of this patent is extended or adjusted under 35 U.S.C. 154(b) by 552 days.

(21) Appl. No.: 11/263,653

(22) Filed: Oct. 31, 2005

(65) Prior Publication Data

US 2007/0107515 A1    May 17, 2007

(51) Int. Cl.
*G01M 1/00* (2006.01)
(52) U.S. Cl. ...................................................... 73/455
(58) Field of Classification Search ................... 73/455, 73/460, 456; 33/530
See application file for complete search history.

(56) References Cited

U.S. PATENT DOCUMENTS

| | | | | |
|---|---|---|---|---|
| 2,096,752 A * | 10/1937 | Metcalf | .......................... | 33/530 |
| 2,669,120 A * | 2/1954 | Jensen et al. | ................... | 73/147 |
| 2,998,079 A | 8/1961 | Chillson | ....................... | 290/55 |
| 3,678,736 A * | 7/1972 | May | ............................. | 73/634 |
| 4,411,073 A * | 10/1983 | Ryan | ........................... | 33/530 |
| 4,642,901 A * | 2/1987 | Webb | .......................... | 33/530 |
| 6,320,273 B1 | 11/2001 | Nemec | ....................... | 416/174 |

OTHER PUBLICATIONS

International Search Report and Written Opinion dated Sep. 28, 2007, issued in corresponding Application No. PCT/US06/41957, filed Oct. 27, 2006.

\* cited by examiner

*Primary Examiner*—Hezron Williams
*Assistant Examiner*—Tamiko D Bellamy
(74) *Attorney, Agent, or Firm*—Christensen O'Connor Johnson Kindness PLLC

(57) ABSTRACT

One embodiment of a propeller tuner assembly (10) formed in accordance with the present disclosure includes a frame (12) and a bearing assembly (64) having a coupler (90) adapted to selectively couple a propeller (20) to the frame (12). The coupler (90) is selectively movable from a first position where at least a portion of the coupler (90) is substantially isolated from tuning loads applied to the bearing assembly (64).

16 Claims, 6 Drawing Sheets

PROPELLER TUNER ASSEMBLY

FIELD OF THE INVENTION

The present disclosure relates generally to propeller tuning assemblies, and more particularly to a propeller tuning assembly that allows for in situ tuning of a propeller.

BACKGROUND OF THE INVENTION

A properly tuned boat propeller can enhance vehicle speed, increase fuel efficiency, and reduce propeller induced vibration. With today's computerized propeller inspection equipment, software programs enable operators to measure a propeller blade to determine whether its pitch or other technical data, such as skew, rake, or camber are in compliance with manufacturer specification.

After blade information is obtained, the propeller is removed from the measuring device, and the blades are hammered, or tuned in the appropriate areas as determined by the measuring device. In most circumstances, the propeller is placed back on the measuring device to confirm whether the blade is in conformance with industry standards. If a blade of the propeller is not yet within a suitable range of pitch, the propeller may again be removed from the measuring device to be tuned in the appropriate areas. The cycle continues until the propeller is within acceptable tolerances of industry standards.

A propeller measuring device includes a rotatable mount and a stylus positioned to measure the pitch of a propeller blade mounted to the rotatable mount. The rotatable mount is coupled to the propeller measuring device by a bearing assembly to enable the rotation. To preserve the mechanical stability of the bearing assembly, the propeller must be removed after blade measurements have been taken so that the propeller may be tuned in the appropriate areas. Otherwise the bearing assembly would bear the load applied during the tuning process, which may cause the bearing assembly to weaken and fail. Removing the propeller for tuning is both time-consuming and labor-intensive.

Based on the foregoing, a need exists for an improved propeller tuning device that can be used for both measuring and tuning propeller blades without requiring the propeller to be removed from the tuning device.

SUMMARY OF THE INVENTION

One embodiment of a propeller tuner assembly formed in accordance with the present disclosure includes a frame and a bearing assembly having a coupler adapted to selectively couple a propeller to the frame. The coupler is selectively movable from a first position where at least a portion of the coupler is substantially isolated from tuning loads applied to the bearing assembly.

BRIEF DESCRIPTION OF THE DRAWINGS

The foregoing aspects and many of the attendant advantages of this invention will become better understood by reference to the following detailed description, when taken in conjunction with the accompanying drawings, wherein.

DETAILED DESCRIPTION OF THE PREFERRED EMBODIMENT

Figure 1:
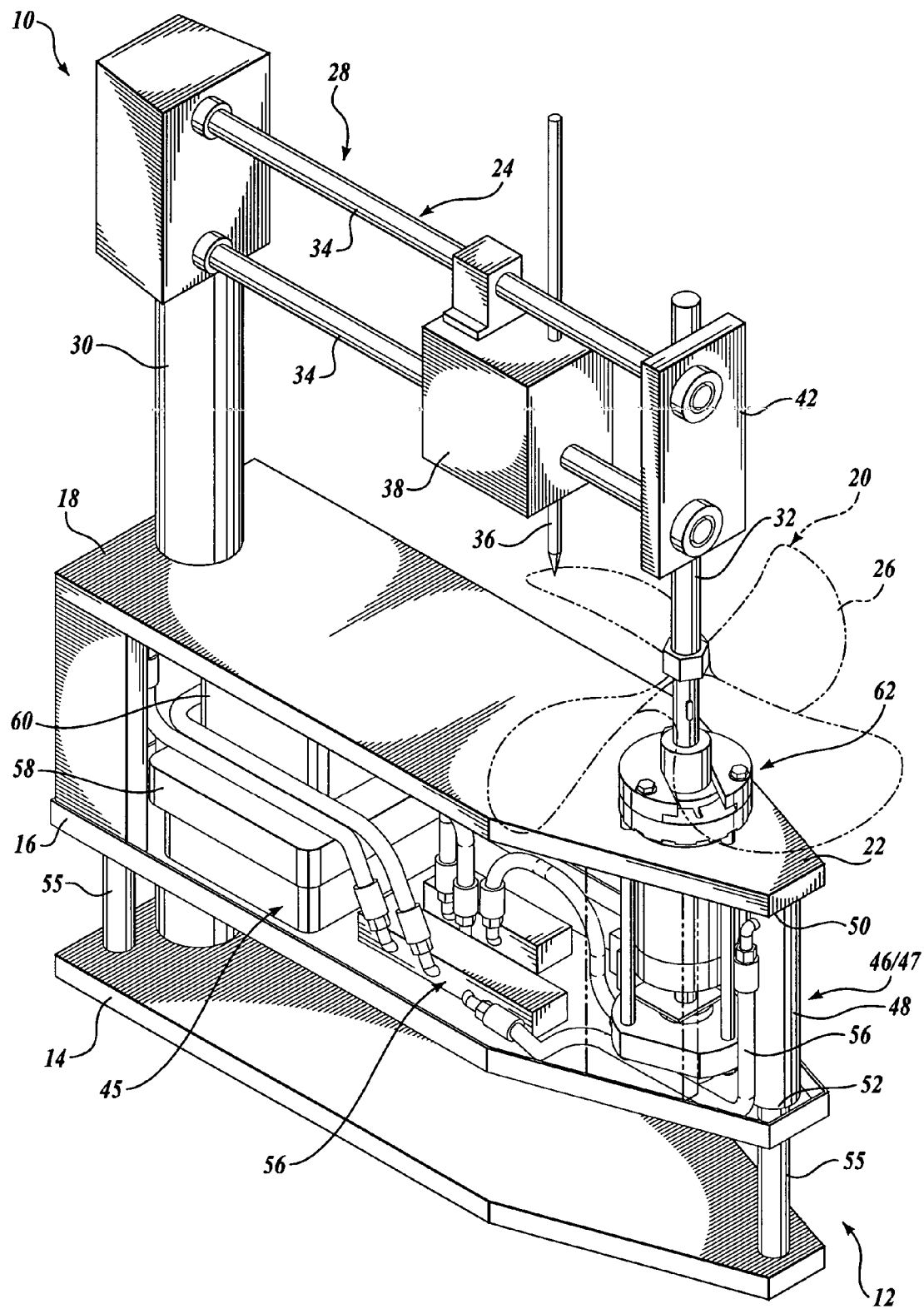
FIG. 1 is an isometric view of a propeller tuning assembly constructed in accordance with one embodiment of the present disclosure, wherein a propeller has been mounted to the tuning assembly.

Referring to FIGS. 1-6, one embodiment of a propeller tuning assembly 10 formed in accordance with the present invention is shown. The propeller tuning assembly 10 includes a support frame 12, a propeller measuring assembly 24, a hydraulic lifting assembly 45, and a propeller mounting assembly 62. The propeller measuring assembly 24 is suspended above the propeller tuning assembly 10 and supported in part by the support frame 12. Upon rotatably mounting a propeller 20 to the support frame 12, the propeller measuring assembly 24 is configured to measure the propeller's pitch while the propeller 20 is rotating. The propeller 20 is rotatably mounted to the support frame 12 through the propeller mounting assembly 62. After obtaining measurements of the propeller 20, the propeller mounting assembly 62 is vertically translated by the hydraulic lifting assembly 45 to isolate at least a portion of the propeller mounting assembly 62. The propeller 20 is thereafter "tuned", or hammered, in the appropriate areas without inducing extreme loads on the isolated portion of the propeller mounting assembly 62. The support frame 12 includes moveable members that vertically adjust when actuated by the hydraulic lifting assembly 45 such that propellers of different sizes may be received on the propeller mounting assembly 62, and technicians may comfortably access the propeller 20 when taking measurements and tuning the propeller 20.

Referring to FIG. 1, the propeller tuning assembly 10 includes a support frame 12 made preferably from solid steel. The support frame 12 includes a lower support member 14, an upper support member 16, and a table member 18. The lower support member 14 provides lower support for the frame 12 by stabilizing the frame when loads are applied to the table member 18. The upper support member 16 supports the propeller tuning assembly and other mechanical and electrical devices as described below. The table member 18 provides an area on which a propeller 20 may be mounted, measured, and tuned, as described below.

The support members 14 and 16, as well as the table member 18 are preferably substantially greater in length and width than height, and each may have relatively flat upper and lower surfaces. The upper and lower support members 14 and 16 are substantially the same shape and size as the table member 18. The table member 18 includes a tapered table end 22 such that when a propeller 20 is mounted to the table member 18 at the tapered end 22 for measuring and tuning, a technician may access the propeller 20 without interference by the table member 18. The support frame members 14, 16, and 18 may be coupled to one another by multiple vertical structural supports. Instead, each support frame member 14, 16, and 18 may be cantilevered to one vertical structural support, wherein the structural support couples members 14, 16, and 18 to cooperatively form support frame 12.

Sill referring to FIG. 1, the frame 12 supports a propeller measuring assembly 24, which can be used to gather measurements and data for a mounted propeller 20. A propeller measuring assembly 24 that is commonly used and generally known to those skilled in the art may be used, such as an assembly designed and manufactured by Hale Propeller, LLC of Old Saybrook, Conn. However, further description of the depicted propeller measuring assembly will be provided for comprehension and clarity. The propeller measuring assembly 24 is used to measure the pitch of each blade 26 of the propeller 20 by obtaining the drop of the blade 26 over each degree of rotation. The propeller measuring assembly 24 may also be used to measure, for instance the rake, skew, or camber of the propeller blade 26. A propeller mounting assembly 62 (later described in detail) is used to rotatably mount a propeller 20 to the table member 18 so that measurements may be taken.

The measuring assembly 24 is suspended above the table member 18 and the mounted propeller 20, and it is supported by a measuring assembly support frame 28. The measuring assembly support frame 28 includes a structural support post 30 that extends from the lower support member 14, through the upper support member 16 and table member 18 to a predetermined distance above the table member 18. The measuring assembly support frame 28 further includes a radial mast 32 extending from the propeller mounting assembly 62, and at least one, but preferably two, horizontal translation rods 34 positioned transversely to the structural support post 30 and radial mast 32. The horizontal translation rods 34 are configured to slidably support a measuring probe 36 and probe housing 38, such that the probe housing 38 may be horizontally translated and the probe 36 may engage and measure the rotating mounted propeller 20. The probe housing 38 includes low friction translating means for lowering probe 36 into selective engagement with the propeller 20. The horizontal translation rods 34 are mounted at one end to the structural support post 30, and at the other end to the radial mast 32. The structural support post 30 includes a support box 40 into which one end of the horizontal translation rods 34 extend, and the radial mast 32 has secured to it an upper radial mounting plate 42 onto which the other end of the horizontal translation rods 34 may be secured.

An optical encoder 44 (shown in FIGS. 3 and 4) is used to detect the rotary and linear positions of the propeller 20 when the probe 36 passes over the rotating propeller 20. Preferably, an optical encoder from US Digital Corporation, such as the EM1 or HED model, is used. Electronic circuitry provides the desired output indication to a central processing unit (CPU) separate from the measuring device. It is understood that an electronic device commonly known in the art may be used. This information sent to the CPU can thereafter be interpreted and displayed through a software program commonly known in the art, such as HALE PROPELLER M.R.I software, designed and manufactured by Hale Propeller, LLC of Old Saybrook, Conn. The information is displayed as data or in a graphical or pictorial format, depending on the software, for a technician's use during the tuning of the propeller. The displayed information will allow the technician to understand in which areas the blade 26 needs to be tuned.

Figure 6:
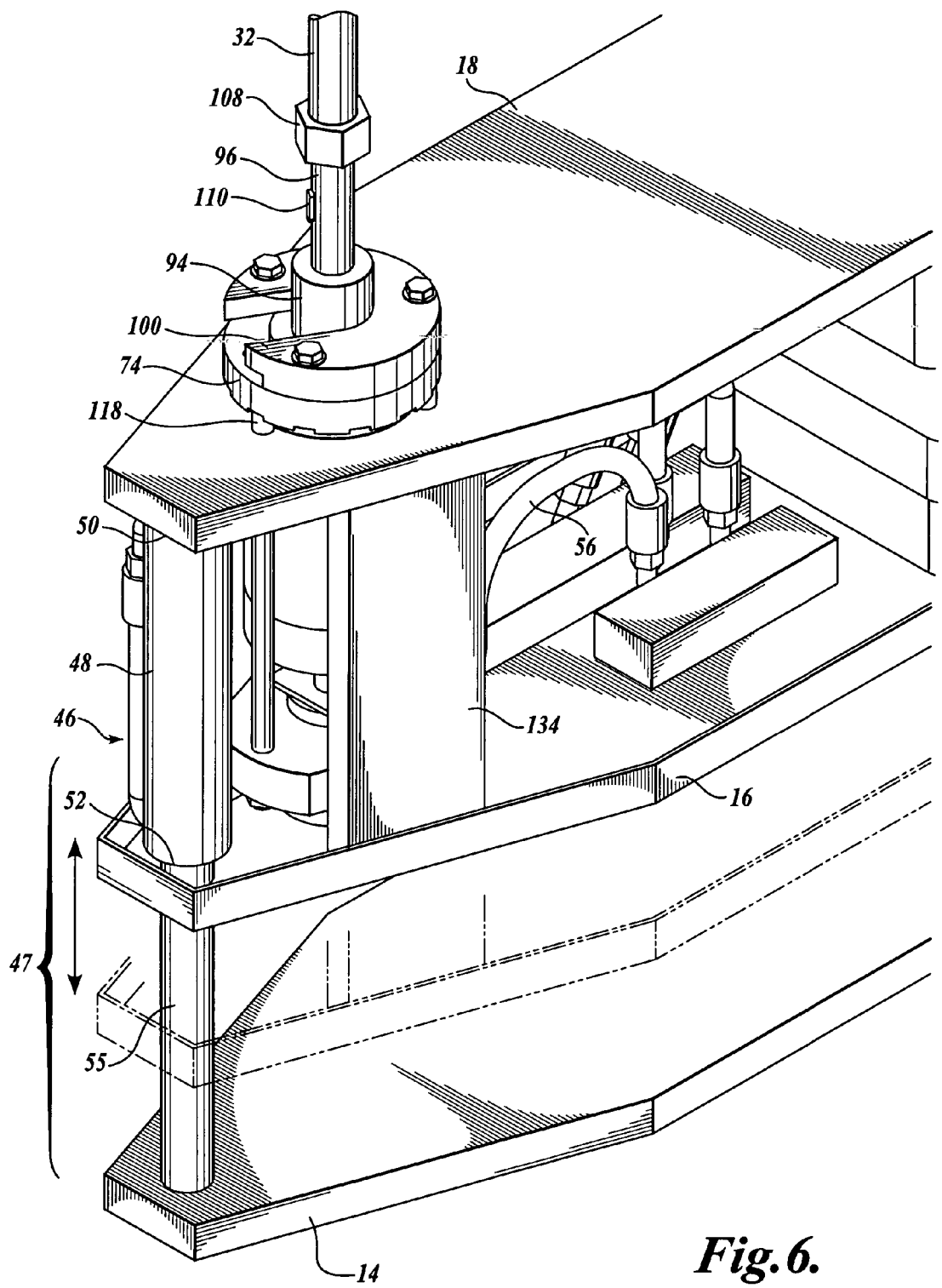
FIG. 6 is a rear perspective view of the propeller tuning assembly shown in FIG. 1, where at least a portion of the propeller tuning assembly has been vertically translated by a hydraulic lifting assembly.

Referring to FIG. 1 and also FIG. 6, the lower support member 14, upper support member 16, and table member 18 are further coupled to one another by a hydraulic lifting assembly 45 that includes hydraulic jacks 46. Preferably, the hydraulic lifting assembly 45 includes three hydraulic jacks 46, one jack 46 being positioned near the tapered end 22 of the support frame 12, and the other two jacks 46 being positioned near the non-tapered portion of the support frame 12. The hydraulic jacks 46 may be an off-the shelf hydraulic jack design commonly know in the art. The jacks 46 contain a hydraulic cylinder/piston assembly 47 that spans between the lower support member 14 and the table member 18. Each cylinder/piston assembly 47 includes a cylinder 48 having a cylinder upper end 50 and a cylinder lower end 52. The cylinder/piston assembly 47 further includes a piston (not shown) and piston rod 55, where the piston is slidably received in the cylinder 48 for reciprocal movement therein. The piston forms a pressure chamber (not shown) between the piston and the upper end 50 of the cylinder 48, into which hydraulic fluid may be received.

The hydraulic lifting assembly 45 further includes hydraulic lines 56 that supply the cylinder/piston assemblies 47 with hydraulic fluid. The hydraulic lines 56 communicate between a hydraulic fluid source or reservoir 58 and the cylinder/piston assemblies 47. Further, a hydraulic pump 60 is in communication with the hydraulic fluid reservoir 58 for selectively supplying the lines 56 with hydraulic fluid. Preferably, the hydraulic pump 60 is a reversible pump that can be actuated by any suitable operator-actuated means. When the pump is actuated to selectively supply the hydraulic lines 56 with hydraulic fluid, the selected cylinder/piston assemblies 47 are supplied with hydraulic fluid in the cylinder pressure chamber (not shown) such that the piston and piston rod 55 extend outwardly from the cylinder 48.

The cylinder 48 supports the table member 18. The cylinder upper end 50 is secured to the bottom surface of the table member 18, and the cylinder lower end 52 is secured to the top surface of the upper support member 16. In this manner, when the piston is actuated to extend outwardly from the cylinder 48, the piston and piston rod 55 may vertically translate the upper support member 16 and table member 18 simultaneously through cylinder 48. It is preferred that each hydraulic jack 46 be actuated simultaneously, such that the upper support member 16 and table member 18 translate vertically while remaining substantially horizontal relative to the ground or floor. Moreover, the structural support post 30 is slidably coupled to the lower support member 14, the upper support member 16, and the table member 18 such that each member translates vertically in relation to the support post 30. By having the ability to raise and lower the table member 18, the support frame 12 can be adjusted to fit and mount propellers 20 of various sizes. In addition, the table member 18 can be adjusted to ergonomically fit each individual technician tuning the propeller 20 on the table member 18.

Figure 2:
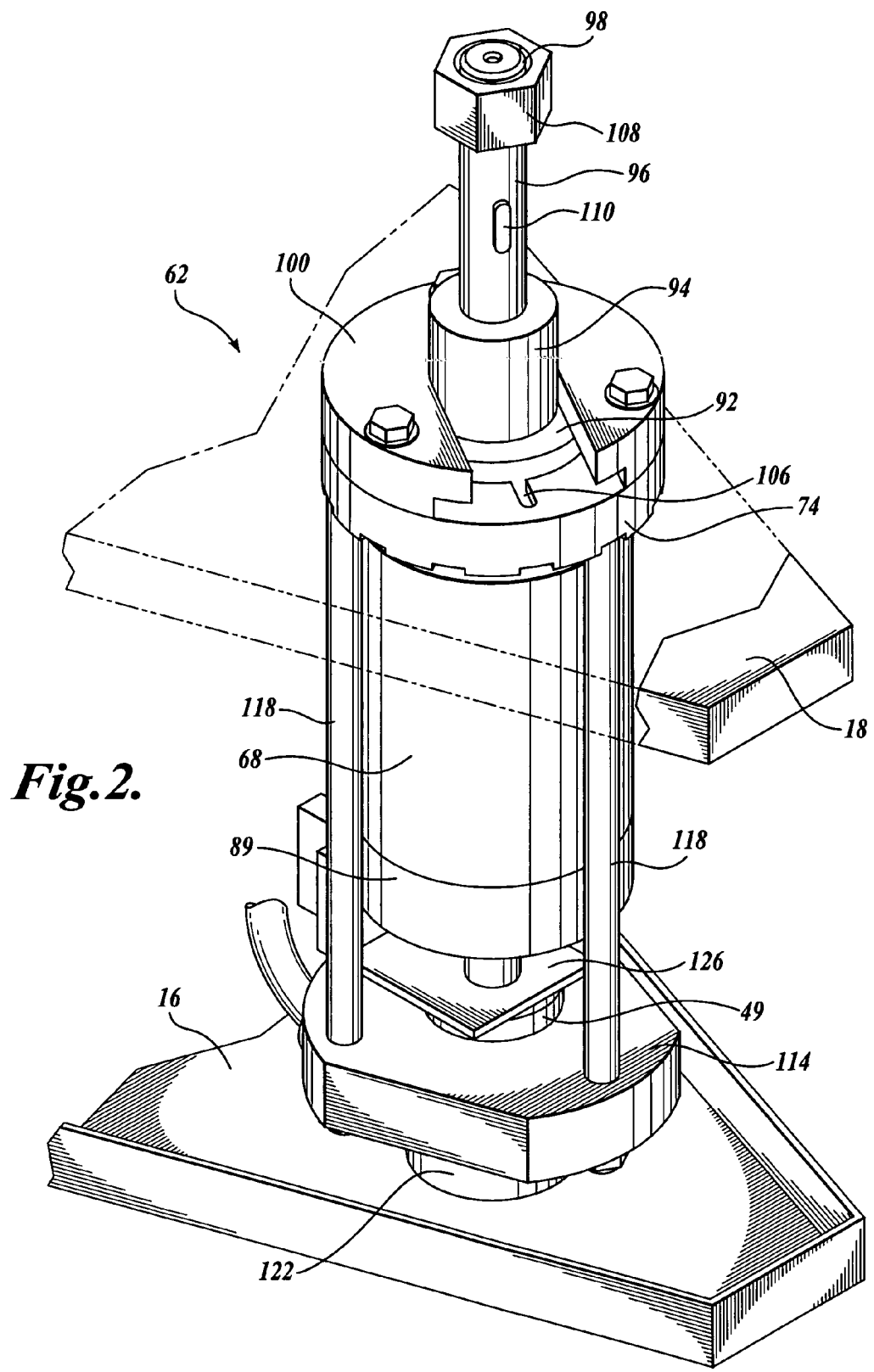
FIG. 2 is a partially fragmentary, isometric view of a propeller mounting assembly of FIG. 1, showing one embodiment of a lifting mechanism.

Now referring to FIG. 2, the propeller mounting assembly 62 is used to mount a propeller 20 to the propeller tuning assembly 10 so that the propeller 20 may be measured and tuned. The propeller mounting assembly 62 rotatably supports a propeller 20 while the propeller 20 is being measured by the propeller measuring assembly 24, and it statically supports a propeller 20 when the propeller 20 is being tuned. The propeller mounting assembly 62 extends from the upper support member 16 through the table member 18, such that the propeller 20 may be mounted above the table member 18 for ease of access.

Figure 3:
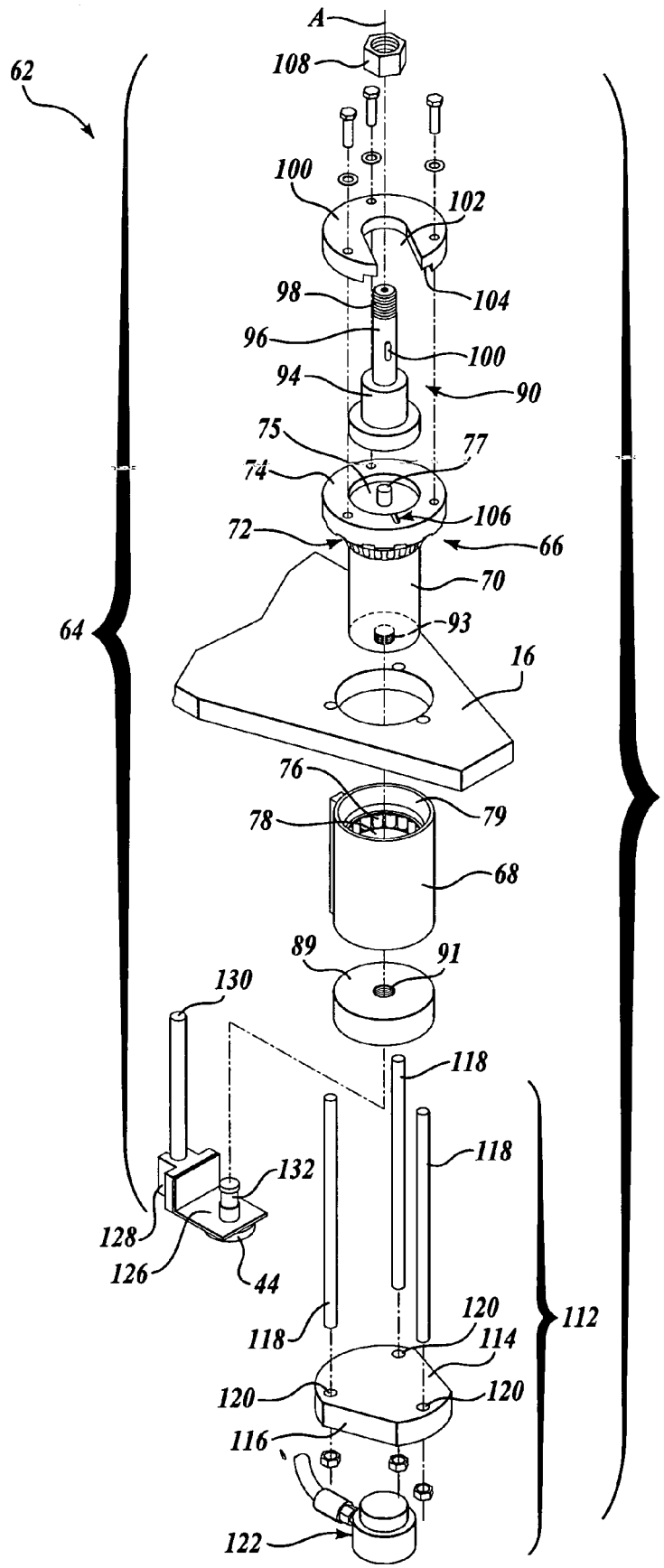
FIG. 3 is an exploded view of the lifting mechanism of FIG. 2.

FIG. 3 shows an exploded view of the propeller mounting assembly 62. The propeller mounting assembly 62 includes a bearing assembly 64 having an upper bearing assembly 66, an outer housing 68, and a propeller coupler 90. The housing 68 is cylindrical in shape, and it is hollow and open at both cylindrical ends to slidably receive and encase the upper bearing assembly 66. The upper bearing assembly 66 may include a bearing shaft 70 that is also cylindrical in shape.

The upper bearing assembly 66 further includes a lock plate 74 mounted to the bearing shaft 70. The lock plate 74 includes a lower circular cavity (not shown) that receives the upper end of the bearing shaft 70. The lock plate 74 is coupled to the bearing shaft 70 in any suitable manner, but it is preferably coupled to the bearing shaft 70 with at least one fastener, such as a screw or bolt. Preferably, the lock plate 74 is mounted to the bearing shaft 70 such that a gap is formed between the lock plate 74 and the table member 18. In this manner, the lock plate 74 may rotate freely about longitudinal axis A with the upper bearing assembly 66 (as later described) without engaging the table member 18. The lock plate 74 is circular in shape and of a sufficient thickness to support the weight of a propeller 20 when the lock plate 74 is lifted by a propeller lifting mechanism 112 (later described). The lock plate 74 includes an upper circular cavity 75 that may be centered on longitudinal center axis A into which propeller coupler 90 (later described) may be received. The lock plate 74 also includes a mounting shaft 77 for coupling the propeller coupler 90 to the lock plate 74.

The bearing assembly 64 also includes at least one set of bearings disposed between the upper bearing assembly 66 and the housing 68. Preferably, two sets of cylindrical roller bearing assemblies 76 are coupled to the housing inner surface 78 near the upper and lower portions of the housing 68. The cylindrical roller bearing assemblies 76 includes rollers 79 and cylindrical roller bearing inner and outer races 80 and 82, where the inner races 80 are secured to the bearing shaft 70, and the outer races 82 are secured to the housing 68. The inner races 80 are separable from the cylindrical bearing assembly 76, such that the rollers 79 may translate vertically relative to the inner races 80. Thus, when the bearing shaft 70 and inner race 80 translate vertically, the rollers 79 may move against the inner races 80. The cylindrical roller bearing assemblies 76 allow the upper bearing assembly 66 to rotate about its center vertical axis A within the housing 68. The cylindrical roller bearing assemblies 76 also maintain the bearing shaft 70 in substantial vertical alignment along center axis A and within the housing 68 by withstanding radial loads produced during rotation. Although any suitable cylindrical roller bearing assembly 76 may be used, a Timken® bearing assembly is preferred.

The bearing assembly 64 also includes a tapered roller bearing assembly 84 that is coupled to an upper portion of the bearing shaft 70. The tapered roller bearing assembly 84 includes a tapered roller bearing inner race (not shown) and outer race 88, where the inner race is secured to the bearing shaft 70, and the outer race 88 is secured to the housing 68. The tapered roller bearing assembly 84 forms an inverted conical frustum shape 72. Thus, the housing inner surface 78 and race 88 are sufficiently contoured to receive the bearing shaft 70 and conical frustum shape 72. Although any suitable tapered roller bearing assembly 84 may be used, a Timken® bearing assembly is preferred. The tapered roller bearing assembly 84 is configured to withstand both radial and thrust loads when the upper bearing assembly 66 rotates within the housing 68 about the center vertical axis A.

The bearing shaft 70, when slidably received by the housing 68, protrudes slightly out of the bottom opening of the housing 68. A vertical limiting plate 89 is coupled to the bottom of the bearing shaft 70, such that when the upper bearing assembly 66 is lifted out of the housing 68 (as later described), the limiting plate 89 may abut the housing 68 and vertically limits the upper bearing assembly 66 from being lifted more than a predetermined distance out of the housing. The vertical limiting plate 89 includes a threaded hole 91, and the bearing shaft 70 includes a threaded protrusion 93 on its bottom surface. Thus, the vertical limiting plate 89 is secured to the bearing shaft 70 by threadably engaging the threaded protrusion 93 within the threaded hole 91. It should be appreciated that in an alternate embodiment, the upper bearing assembly 66 may be limited in vertical translation by alternative means. As yet another non-limiting example, the housing 68 and the plate 89 are constructed as a single, unitary body and the jack 122 is connected to the bearing shaft 70. In such an embodiment, the jack 122 reciprocates the upper bearing assembly 66 into and out of engagement with the outer race 88 by limiting travel of the jack 122 in a well-known manner. Accordingly, such embodiments are within the scope of the present disclosure.

An optical encoder 44 is mounted beneath the vertical limiting plate 89. The optical encoder 44 is mounted on the bottom surface of an encoder mounting bracket 126. A shaft 132 is coupled to the top surface of the bracket 126. The shaft 132 is engageable with an aperture (not shown) on the bottom surface of the vertical limiting plate 89. The top portion of the shaft 132 is threaded, and the aperture on the bottom surface of the vertical limiting plate 89 is likewise threaded such that the shaft 132 may be threadably engaged with the vertical limiting plate 89. Thus, the optical encoder 44 translates vertically with the upper bearing assembly 66 when the assembly 66 is lifted out of the housing 68.

A linear bearing 128 is secured to the encoder mounting bracket 126 by any suitable means known in the art. The linear bearing 128 slidably engages a bearing shaft 130, wherein at least a portion of the shaft 130 is coupled to the outer surface of the housing 68. The linear bearing 128 slides vertically along the bearing shaft 130 such that the optical encoder 44 and encoder mounting bracket 126 also translate vertically in the same fashion. In this manner, the optical encoder 44 will travel with the upper bearing assembly 66 when it is lifted out of the housing 68 while its vertical alignment is maintained through the linear bearing 128. It can be appreciated that the optical encoder 44 may be translated vertically without the support of a linear bearing 128; however, for vertical alignment purposes, the use of a linear bearing 128 is preferred.

Still referring to FIG. 3, and also FIG. 2, the bearing assembly 64 further includes a propeller coupler 90 having a propeller coupler base 92. Coupled to the propeller coupler base 92 is a boss 94, and coupled to the boss 94 is a propeller spindle 96 having a threaded portion 98 at the upper end. The propeller coupler base 92 generally conforms to the shape of the lock plate circular cavity 75. The bottom surface of the propeller coupler base 92 includes a hole (not shown) that may engage the mounting shaft 77 of the lock plate 74. The mounting shaft 77 may be threaded, and the propeller coupler base 92 hole may likewise be threaded such that the mounting shaft 77 may be threadably received by the propeller coupler base 92 hole. Thus, to couple the propeller coupler 90 to the upper bearing assembly 66, the propeller coupler base 92 is received into the lock plate circular cavity 75, and the mounting shaft 77 of the lock plate 74 is received by the propeller coupler base 92 hole.

A mounting plate 100 is configured to further secure the propeller coupler base 92 to the lock plate 74. The mounting plate 100 includes a U-shaped opening 102 and a U-shaped cavity 104. Thus, the propeller coupler 90 receives the mounting plate 100 such that the propeller coupler base 92 is received into the U-shaped cavity 104, and the boss 94 protrudes through the U-shaped opening 102. The mounting plate 100 is then fastened to the lock plate 74 with any suitable fastener (such as a bolt or screw) to securely fasten the propeller coupler 90 to the upper bearing assembly 66.

The lock plate 74 includes a keyway 106 that is configured to guide the propeller coupler 90 when being mounted to the upper bearing assembly 66. The keyway 106 may also receive a key (not shown), such as a pin, rod, or other suitable device that is sufficiently long to mate a similarly shaped keyway formed on the bottom surface of the propeller coupler base 92. The key may be used to secure the propeller coupler base 92 to the lock plate 74 rather than threadably fastening the propeller coupler base 92 to the lock plate 74.

As shown in FIG. 1, a propeller 20 is mounted onto the propeller coupler 90. The propeller 20 includes a central opening that is received by the propeller coupler shaft 96. Referring again to FIG. 3, the propeller 20 is then secured to the propeller coupler shaft 96 by a fastener, such as nut 108. The nut 108 is threaded so as to mate to the threaded portion 98 on the end of the propeller coupler shaft 96. The propeller coupler shaft 96 further includes a protrusion 110 that receives a keyed portion (not shown) on the inside surface of the central opening of the propeller 20. Thus, when the protrusion 110 is received into the keyed portion inside the propeller opening, the propeller 20 will be non-rotatable about the propeller coupler shaft 96. Therefore, the propeller 20 will not rotate about the propeller coupler shaft 96 when the propeller coupler shaft 96 is rotated (as described below) to measure the propeller 20.

Still referring to FIG. 3, the propeller lifting mechanism 112 includes a lifting plate 114 that is generally circular but includes two chamfered portions 116. The lifting plate 114 is coupled to at least two, but preferably three lock pins 118. The lifting plate 114 includes lock pin apertures 120 into which the lock pins 118 are received and secured. Preferably, the lock pin apertures 120 are threaded and the end portions of the lock pins 118 are threaded so that the lock pins 118 may be threadably received by the apertures 120. The lock pins 118 are positioned in the lock plate 114 near the perimeter of the lock plate 114, and each pin 118 is equidistant from the other lock pins 118 in a general triangular pattern. Beneath the lifting plate 114 is a hydraulic jack 122 that is actuated to vertically translate the lifting plate 114 and lock pins 118.

As shown in FIG. 6, face plates 134 are disposed between upper support member 16 and table member 18. Preferably, one face plate 134 is positioned on each side of the tapered table end 22, such that at least a portion of the face plate 134 abuts the chamfered portion 116 of the lifting plate 114. The face plates 134 provides additional support for the table member 18, and also helps maintain the vertical alignment of the propeller lifting mechanism 112 and the upper bearing assembly 66 when actuated by hydraulic jack 122.

Figure 4:
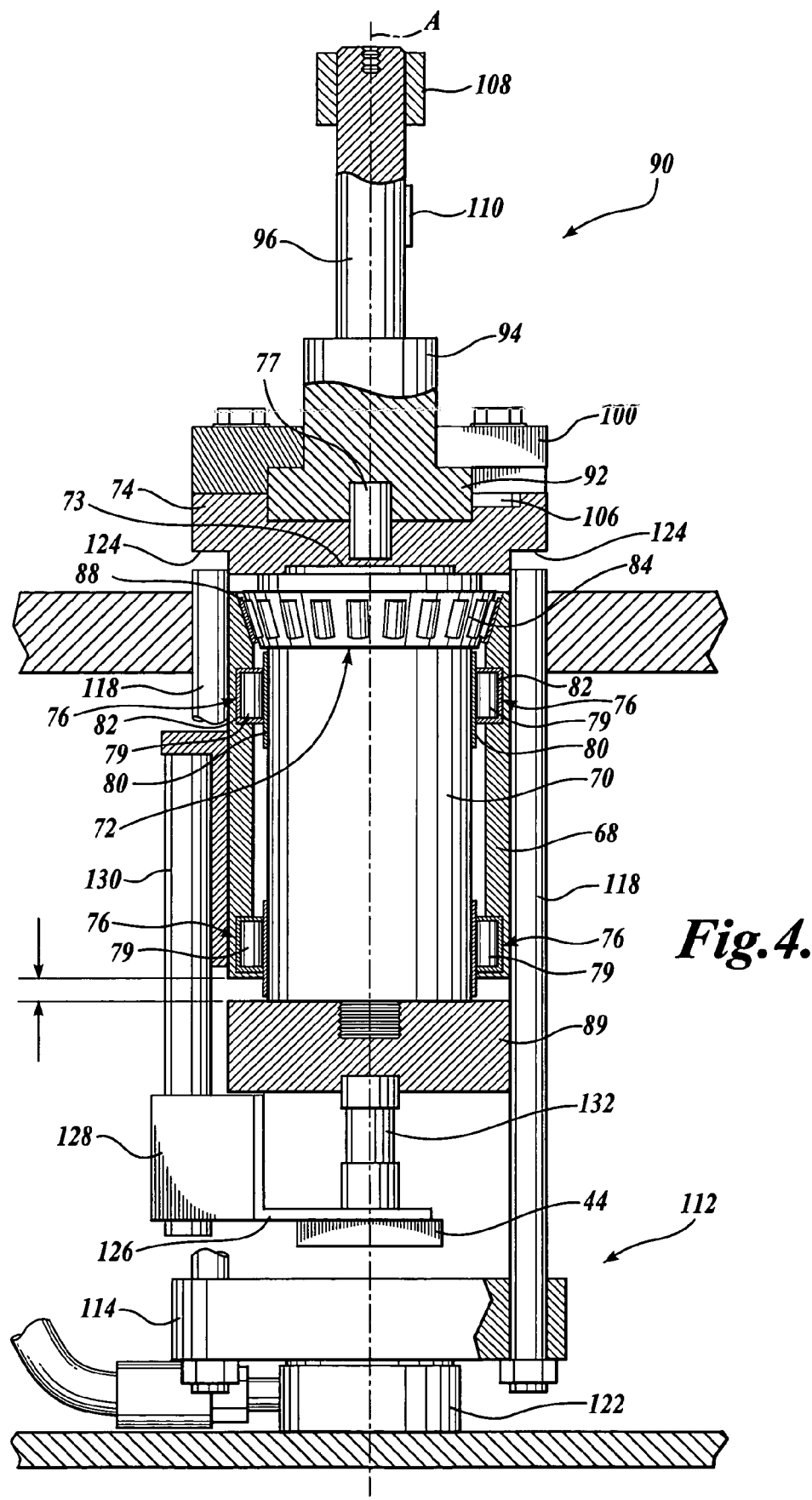
FIG. 4 is a sectional view of the propeller mounting assembly and lifting mechanism shown in FIG. 2, where the lifting mechanism is decoupled from the propeller mounting assembly.
Figure 5:
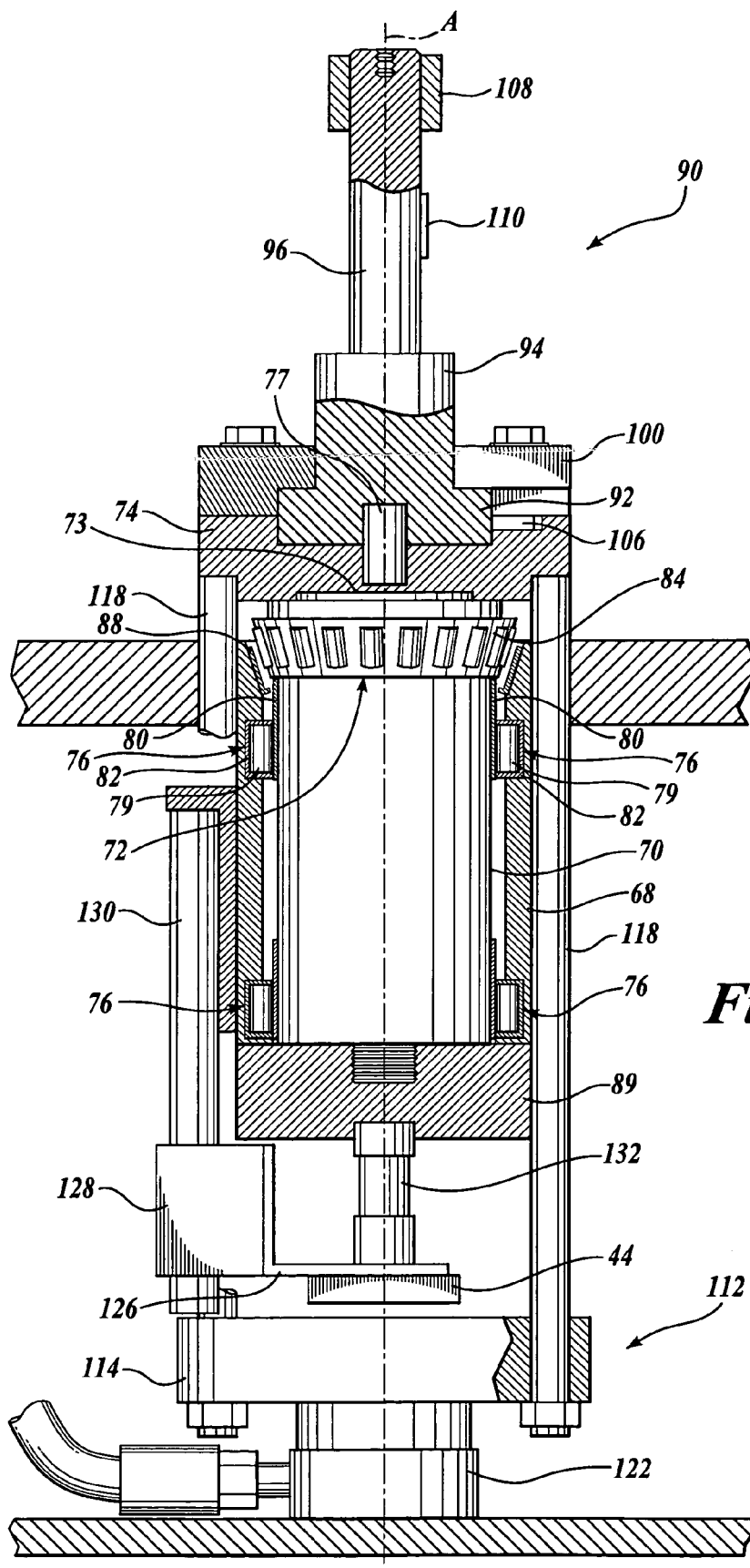
FIG. 5 is a sectional view of the propeller mounting assembly and lifting mechanism shown in FIG. 2, where the lifting mechanism is engaging the propeller mounting assembly.

Now referring to FIGS. 4 and 5, the propeller lifting mechanism 112 engages and vertically translates the upper bearing assembly 66 so that it is lifted out of the housing 68. As shown in FIG. 4, the lock pins 118 are of a sufficient length to extend from the lifting plate 114 up through the table member 18. For clarity and ease of illustration, two lock pins 118 have been shown extending through table member 18, notwithstanding the fact that a standard cross-section view of the triangular pattern of lock pins 118 would reveal only one lock pin 118. FIG. 5 shows hydraulic jack 122 actuated to selectively drive the lock pins 118 into engagement with the lock plate 74. Specifically, the lock pins 118 are selectively received into lock cavities 124 formed on the bottom surface of the lock plate 74. The jack 122 continues to drive the lock pins 118 into the lock plate 74 while the housing 68 remains stationary. The upper bearing assembly 66 is then raised out of the housing 68 thereby lifting the tapered bearing assembly 84 out of contact with the outer race 88.

FIG. 4 shows the lock pins 118 disengaged from the lock plate 74, such that the upper bearing assembly 66 is in an unlocked, freely rotatable state. In this unlocked state, the upper bearing assembly 66 may rotate within housing 68 about the longitudinal axis A. Similarly, the propeller coupler 90 may rotate simultaneously with the upper bearing assembly 66. Thus, when a propeller 20 is mounted to the propeller coupler 90, the propeller 20 is rotated and measured by the propeller measuring assembly 24.

FIG. 5 depicts the locked pins 118 received into the lock cavities 124 when the hydraulic jack 122 has been actuated. The hydraulic jack 122 drives the lock plate 74 upward and lifts the upper bearing assembly 66 out of the housing 68. In this lifted state, the upper bearing assembly 66 and propeller coupler 90 are maintained in a static, non-rotatable position such that a mounted propeller 20 may be tuned. In addition, when the upper bearing assembly 66 is lifted out of the housing 68, thereby lifting the tapered bearing assembly 84 out of contact with the outer race 88, the tapered bearing assembly 84 is substantially isolated from any loads applied to the propeller coupler 90 during tuning (i.e. "tuning loads").

Use of the propeller tuning assembly 10 may be best understood by referring to FIGS. 1, 4, and 5. A propeller 20 is placed on the propeller mounting assembly 62. More specifically, the propeller 20 is fitted onto the propeller coupler shaft 96 of the propeller coupler 90. The bearing assembly 64 is configured in the rotatable, unlocked position, as shown in FIG. 4. In other words, the lifting mechanism 112 has not been translated vertically to lift the upper bearing assembly 66 out of the housing 68. Thus, the upper bearing assembly 66 may rotate freely about the longitudinal vertical axis A within the housing 68.

The propeller measuring assembly 24 is used to gather propeller measurements by slidably engaging the measuring probe 36 with the propeller blade 26 while the propeller 20 rotates with the upper bearing assembly 66 and propeller coupler 90. The optical encoder 44 gathers and sends data to a CPU (not shown) so that the blade's pitch and other technical data may be displayed and the technician may understand in which areas the blade 26 needs to be hammered, or tuned.

The lifting mechanism 112 may then be actuated with jack 122 by the technician to translate the upper bearing assembly 66 and propeller coupler 90, as best shown in FIG. 5. The lock pins 118 engage the lock plate 74 and lift the upper bearing assembly 66 out of the housing 68. Thus, the rollers 79 of the tapered roller bearing assembly 84 are taken out of contact with the outer race 88, and the upper bearing assembly 66 may not rotate with respect to the housing 68. In this locked position, the blades of the propeller 20 may be tuned in the appropriate areas by the technician while substantially isolating the upper bearing assembly 66 and the tapered roller bearing assembly 84 from tuning loads associated with the hammering action.

The upper bearing assembly 66 and propeller coupler 90 are lowered by the lifting mechanism 112 so that the upper bearing assembly 66 may again rotate freely within the housing 68 and the technician may repeat the propeller measuring process. The propeller blade 26 is again measured while the propeller 20 rotates with the upper bearing assembly 66 and propeller coupler 90. The optical encoder 44 then sends the technical data to the CPU, where the data is displayed so that the technician may repeat the tuning process if necessary.

This cycle is repeated until the propeller is substantially "true," or until the data conforms to the propeller specification requirements. When the propeller 20 is found to be substantially true, the propeller 20 may be removed from the propeller tuning assembly 10.

While the preferred embodiment of the invention has been illustrated and described, it will be appreciated that various changes can be made therein without departing from the spirit and scope of the invention. For instance, the propeller tuning assembly 10 could be modified to mount other devices for measurement and tuning, such as musical instruments.

The embodiments of the invention in which an exclusive property or privilege is claimed are defined as follows:

1. A propeller tuner assembly that can be used for both measuring and tuning propeller blades, comprising:
   (a) a support frame;
   (b) a bearing assembly comprising:
      (i) a propeller coupler adapted to selectively couple a propeller to the propeller tuner assembly that can be used for both measuring and tuning propeller blades;
      (ii) a housing configured to receive the propeller coupler;
      (iii) at least one set of bearings disposed between the housing and the propeller coupler, the propeller coupler movably coupled to the frame between at least a rotatable position, wherein the propeller coupler is rotatable about a vertical axis, and a non-rotatable position, wherein the propeller coupler is locked into a static position.

2. The propeller tuning assembly of claim 1, wherein the bearing assembly is movably mounted to the frame for selective height adjustment.

3. The propeller tuning assembly of claim 1, further comprising a lifting mechanism coupled to the propeller coupler to reciprocate the propeller coupler between the rotatable and non-rotatable positions.

4. The propeller tuning assembly of claim 1, wherein the at least one set of bearings are at least in part coupled to the propeller coupler to permit rotational movement of the propeller coupler relative to at least a portion of the bearing assembly.

5. The propeller tuning assembly of claim 1, wherein the housing further comprises a race portion sized and configured to engage the at least one set of bearings when the propeller coupler is selectively displaced into the rotatable position.

6. The propeller tuning assembly of claim 5, further comprising a lifting mechanism coupled to the propeller coupler to disengage the at least one set of bearings from the race portion when the propeller coupler is selectively displaced into the non-rotatable position.

7. The propeller tuning assembly of claim 6, wherein the bearing assembly is movably mounted to the frame for selective height adjustment.

8. A method of measuring and tuning propeller blades, the method comprising:
   (a) providing a propeller tuning assembly that can be used for both measuring and tuning propeller blades, the assembly comprising:
      (i) a bearing assembly having a propeller coupler adapted to selectively couple a propeller to the propeller tuner assembly, a housing configured to receive the propeller coupler, and a lifting mechanism; and
      (ii) a measuring device for measuring the pitch of the propeller;
   (b) coupling the propeller to the propeller coupler;
   (c) measuring the propeller with the measuring device;
   (d) lifting the propeller coupler out of the housing with the lifting mechanism; and
   (e) applying loads to the propeller.

9. The method of tuning a propeller of claim 8, wherein the bearing assembly is movably mounted to the frame for selective height adjustment.

10. The method of tuning a propeller of claim 8, wherein the propeller coupler is selectively displaceable between a first position, wherein the propeller coupler is rotatable relative to the frame, and a second position, wherein the propeller coupler is non-rotatable relative to the frame.

11. The method of tuning a propeller of claim 10, wherein the propeller is measured by the measuring device when the propeller coupler is in the first position, and wherein loads are applied to the propeller when the propeller coupler is in the second position.

12. The method of tuning a propeller of claim 10, wherein the lifting mechanism coupled to the propeller coupler reciprocates the propeller coupler between the first and second positions.

13. The method of tuning a propeller of claim 8, wherein the propeller timing assembly further comprises at least one set of bearings at least in part coupled to the propeller coupler to permit rotational movement of the propeller coupler relative to at least a portion of the bearing assembly.

14. The method of tuning a propeller of claim 13, wherein the housing is coupled to the frame, and the housing further comprises a race portion sized and configured to engage the at least one set of bearings when the propeller coupler is selectively displaced into the first position where the propeller coupler is rotatable relative to at least a portion of the bearing assembly.

15. The method of tuning a propeller of claim 14, wherein the lifting mechanism is coupled to the propeller coupler to disengage the at least one set of bearings from the race portion when the propeller coupler is selectively displaced into the second position.

16. The method of tuning a propeller of claim 14, wherein the bearing assembly is movably mounted to the frame for selective height adjustment.

\* \* \* \* \*

UNITED STATES PATENT AND TRADEMARK OFFICE
CERTIFICATE OF CORRECTION

| | | | |
|---|---|---|---|
| PATENT NO. | : 7,565,838 B2 | | Page 1 of 1 |
| APPLICATION NO. | : 11/263653 | | |
| DATED | : July 28, 2009 | | |
| INVENTOR(S) | : J. Clubine | | |

It is certified that error appears in the above-identified patent and that said Letters Patent is hereby corrected as shown below:

| COLUMN | LINE | ERROR |
|---|---|---|
| 9 (Claim 1 | 15 line 4) | "a bearing assembly comprising:" should read --a bearing assembly that can be used for both measuring and tuning propeller blades comprising-- |

Signed and Sealed this

Thirty-first Day of January, 2012

David J. Kappos
*Director of the United States Patent and Trademark Office*